United States Patent [19]
Kuratomi et al.

[11] Patent Number: 5,515,189
[45] Date of Patent: May 7, 1996

[54] NEURAL NETWORK DEVICE AND IMAGE RECOGNITION METHOD EMPLOYING PHOTOCONDUCTIVE LIQUID CRYSTAL DEVICE WITH PATTERNED ELECTRODE

[75] Inventors: Yasunori Kuratomi; Koji Akiyama; Akio Takimoto, all of Osaka; Michihiro Miyauchi, Aichi; Koji Nomura; Hisahito Ogawa, both of Nara, all of Japan

[73] Assignee: Matsushita Electric Industrial Co., Ltd., Osaka, Japan

[21] Appl. No.: 899,925

[22] Filed: Jun. 17, 1992

[30] Foreign Application Priority Data

Jun. 17, 1991 [JP] Japan .................................. 3-144666
Oct. 2, 1991 [JP] Japan .................................. 3-255026

[51] Int. Cl.$^6$ .............................. G02F 1/13; G06G 7/00; G06K 9/36
[52] U.S. Cl. .................... 359/72; 359/36; 359/87; 395/25; 364/822; 364/807; 382/260; 382/304; 382/159
[58] Field of Search .................. 359/72, 53, 36, 359/87; 395/24, 25; 364/822, 807; 307/201; 382/14, 15, 260, 304

[56] References Cited

U.S. PATENT DOCUMENTS

| | | | |
|---|---|---|---|
| 4,110,014 | 8/1978 | Yevick | 359/72 |
| 4,601,537 | 7/1986 | Saccocio | 359/72 |
| 4,692,892 | 9/1987 | Anizan et al. | 359/36 |
| 4,693,561 | 9/1987 | Ashley | 350/366 |
| 4,913,531 | 4/1990 | Efron et al. | 359/72 |
| 5,056,897 | 10/1991 | Akiyama et al. | 359/72 |
| 5,109,290 | 5/1992 | Imai | 359/72 |
| 5,168,378 | 12/1992 | Black et al. | 359/72 |
| 5,212,377 | 3/1993 | Rosan | 395/25 |
| 5,220,644 | 6/1993 | Horan | 395/25 |
| 5,268,679 | 12/1993 | Shannon | 345/92 |

FOREIGN PATENT DOCUMENTS

| | | |
|---|---|---|
| 0181817 | 5/1986 | European Pat. Off. . |
| 0375165 | 6/1990 | European Pat. Off. . |
| 0402944 | 12/1990 | European Pat. Off. . |
| 0494671 | 7/1992 | European Pat. Off. . |
| 60-243629 | 3/1985 | Japan . |
| 2164759 | 3/1986 | United Kingdom . |

OTHER PUBLICATIONS

M. Ishikawa et al., *Experimental Studies On Learning Capabilities Of Optical Associative Memory*, Applied Optics, vol 29, No. 2, pp. 289–295 (Jan. 10, 1990).
Y. Kuratomi et al., An Optical Neural Network Using Vector Feature Extraction (submitted to *Applied Optics*).

*Primary Examiner*—William L. Sikes
*Assistant Examiner*—Kenneth Parker
*Attorney, Agent, or Firm*—Willian Brinks Hofer Gilson & Lione

[57] ABSTRACT

A light modulation device comprising a first transparent electrode layer, a photoconductive layer, a conductive electrode, a light modulation layer, and a second transparent electrode layer formed together in the preceding order, and characterized by the light modulation characteristic of the light modulation layer being a non-linear saturation function of an applied electrical field, and the conductive electrode comprising plural electrode patterns. The light modulation layer modulates the read light when the input light exceeds a specific threshold value wherein by forming the electrode pattern of the conductive electrode in the shape of the pattern to be extracted, the features of the input image corresponding to that shape can be quickly extracted.

6 Claims, 20 Drawing Sheets learned capital input capital result of recognition

A

NEURAL NETWORK DEVICE AND IMAGE RECOGNITION METHOD EMPLOYING PHOTOCONDUCTIVE LIQUID CRYSTAL DEVICE WITH PATTERNED ELECTRODE

BACKGROUND OF THE INVENTION

1. Field of the Invention

The present invention relates to a light modulation device used for optical information processing, and to an image recognition method for processing images using a neural network constructed to simulate the information processing mechanism of the human brain.

2. Prior Art

Information processing devices based on neural networks have been studied in recent years, and the optical neural network in particular has been developed as an effective means of high speed processing of two-dimensional image data (M. Ishikawa, et al., Applied Optics, Vol. 29, No. 2, pp. 289–295 (1990)). The optical neural network uses an optical signal as the data medium due to its high speed transmission capability and spatial parallelism properties. The spatial light modulation device is a key component to the construction of an optical neural network.

FIG. 24 is a cross section of a conventional spatial light modulation device 1 comprising a transparent electrode 2, a photoconductive layer 3, a light reflecting layer 4, a light modulation layer 5, and a second transparent electrode 2' formed together in that order and sandwiched between a substrate 6 and 6' on each side. This device operates as follows.

When an input light 7 with a two-dimensional distribution of light intensity is incident on the photoconductive layer 3, carriers corresponding to the light distribution are produced and the electrical resistance of the area of the photoconductive layer in which the light is incident on 3 drops. A voltage is applied between the transparent electrodes 2 and 2', and the voltage applied to the light modulation layer 5 increases at the area corresponding to the area in which the electrical resistance dropped in the photoconductive layer 3. Thus a read light 8 is spatially modulated according to the light distribution of the input light 7. The light reflecting layer 4 is simply provided to efficiently reflect the read light 8.

3. Problem to be Solved

Accurately and quickly extracting features peculiar to the image is essential to improving the recognition performance of an optical neural network.

However, the conventional spatial light modulation device simply functions as an image input device and does nothing more than execute simple logic operations such as digitization resulting from the light modulation characteristics of the light modulation layer. It is impossible for these devices to extract the specific features of the image.

Furthermore, extracting the specific features of the input image requires the input image to be photoelectrically converted and stored in an image memory for feature extraction processing by an electronic computer. This process is time-consuming and processing time will increase when the matrix of the image is increased.

SUMMARY OF THE INVENTION

Therefore, an object of the present invention is to provide a light modulation device with a simple structure for extracting the specific features of the input image in a high speed manner. A further object of the invention is to provide an image recognition method which is based on a neural network using features extracted by the light modulation device.

To achieve this objective, a light modulation device according to the present invention comprises a first transparent electrode layer, a photoconductive layer, a conductive electrode, a light modulation layer, and a second transparent electrode layer formed in the preceding order, and is characterized by light modulation characteristics against an applied electrical field of the light modulation layer being a non-linear saturation function, and the conductive electrode comprising plural electrode patterns.

In the above device there is preferably an insulating layer provided where the electrode patterns overlap.

In addition, it is preferable in the above device that the conductive electrode be a combination of plural parallel electrode patterns of which the long directions are formed parallel to each other or intersecting at 45° or 90°.

In addition, it is preferable in the above device that the photoconductive layer and the conductive electrode have the same two-dimensional distribution pattern.

In addition, it is preferable in the above device that the light modulation layer and the conductive electrode have the same two-dimensional distribution pattern.

In addition, it is preferable in the above device that the conductive electrodes have optical reflectivity.

In addition, it is preferable in the above device that electrode patterns of identical shape be placed in a two-dimensional matrix, and be electrically connected to each other.

In addition, it is preferable in the above device that the electrically connected electrode patterns be of equal area.

In addition, it is preferable in the above device that a shield layer for blocking incident light to the photoconductive layer be provided between the first transparent electrode and the photoconductive layer at those areas where there is no conductive electrode.

As a further means of achieving the object of the invention, an image recognition method according to the present invention recognizes images based on the neural network using information about line segments and geometric shapes extracted by a light modulation device comprising a first transparent electrode layer, a photoconductive layer, a conductive electrode, a light modulation layer, and a second transparent electrode layer formed in the preceding order, and characterized by the light modulation layer having light modulation characteristics of a non-linear saturation function against an applied electrical field, and the conductive electrode comprising plural electrode patterns to extract line segments and geometric shapes included in the image.

OPERATION

The light modulation device of the present invention is constructed with facing transparent electrodes sandwiching the photoconductive layer and the light modulation layer, and the conductive electrodes formed between the photoconductive layer and the light modulation layer. The conductive electrodes comprise plural electrode patterns which are continual only in a specific direction.

The principle of operation is described below.

(1) When light is not incident on the photoconductive layer, the electrical resistance of the photoconductive layer is considerably higher than that of the light modulation layer. A voltage applied between the transparent electrodes is therefore applied primarily to the photoconductive layer, and the electrical field applied to the light modulation layer is low. The read light is therefor not modulated.

(2) When light is incident on the photoconductive layer, carriers corresponding to the light distribution are generated, the electrical resistance of the photoconductive layer drops, and the strength of the field applied to the light modulation layer increases in accordance with the laws of voltage distribution.

The higher the input light intensity becomes, the lower the electrical resistance of the photoconductive layer becomes. However, because the light modulation layer has a modulation characteristic of a non-linear saturation function against the applied field strength, (i.e., the input light intensity) the light modulation layer can modulate the read light only when the applied field strength exceeds a predetermined threshold value.

A voltage is applied to the light modulation layer where the electrode pattern is present. Since, the light modulation layer can modulate the read light only when its corresponding photoconductive layer is illuminated by an input light having a total intensity which exceeds the threshold value, the features of the input image corresponding to the shapes of the electrode patterns can be extracted.

Thus, by forming the conductive electrode shaped like the patterns to be extracted, the specific features of the input image can be extracted at high speed.

When the conductive electrode comprises plural parallel electrode patterns, the line segments parallel to the lengthwise direction of the electrode pattern will correspond to specific image features, and if the line segments of a length that is at least long enough to satisfy the threshold value of light modulation layer is in the image, the read light corresponding to that part will be modulated and the corresponding line segments can be extracted.

Furthermore, the image features that can be extracted are not limited to line segments. By giving the electrode pattern a circular, polygonal, or even nebulous shape, image features that correspond to that shape can also be extracted. In addition, short circuiting of the electrode patterns can be prevented by providing an insulation layer where the electrode patterns overlap at intersections.

In particular, vertical, horizontal, left-oblique ("/"), right-oblique ("/") line segments can be extracted as specific image features if the conductive electrodes comprise plural parallel electrode patterns, and the lengthwise directions of the electrode patterns are parallel to each other or intersect at 45° or 90°.

Furthermore, carrier crosstalk can be prevented if the photoconductive layer and the conductive electrode are formed with the same two-dimensional distribution pattern.

Furthermore, the modulation contrast of the read light can be improved if the light modulation layer and the conductive electrode are formed with the same two-dimensional distribution pattern.

Furthermore, the detection contrast of the output image can be improved if a shield layer for blocking incident light is provided between the first transparent electrode and the photoconductive layer at those areas where there is no conductive electrode.

Furthermore, the detection sensitivity can be increased if the conductive electrode has optical reflectivity because part of the input light passing through the photoconductive layer will be reflected by the conductive electrode and enter the photoconductive layer again. In addition, the light utilization efficiency of the read light can be increased because the read light that passed the light modulation layer will be reflected by the conductive electrode and enter the light modulation layer again.

In addition, the input image can then be broken down into the pixel units of an n×m matrix for image processing (where n and m are natural numbers) if electrode patterns of identical shape are periodically placed in a two-dimensional matrix. Furthermore, patterns of the desired shape can be easily designed if these periodically placed electrodes are electrically connected to each other.

In addition, many kinds of geometric patterns can be extracted with a single threshold value characteristic if the electrically connected electrode patterns are of equal area.

Furthermore, the image recognition method of the invention greatly improves the image recognition capability of an optical neural network using the above light modulation device by extracting line segments and geometric shapes included in the image as specific image features.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of a light modulation device according to the present invention are described below with reference to the accompanying figures.

FIRST EMBODIMENT

Figure 1:
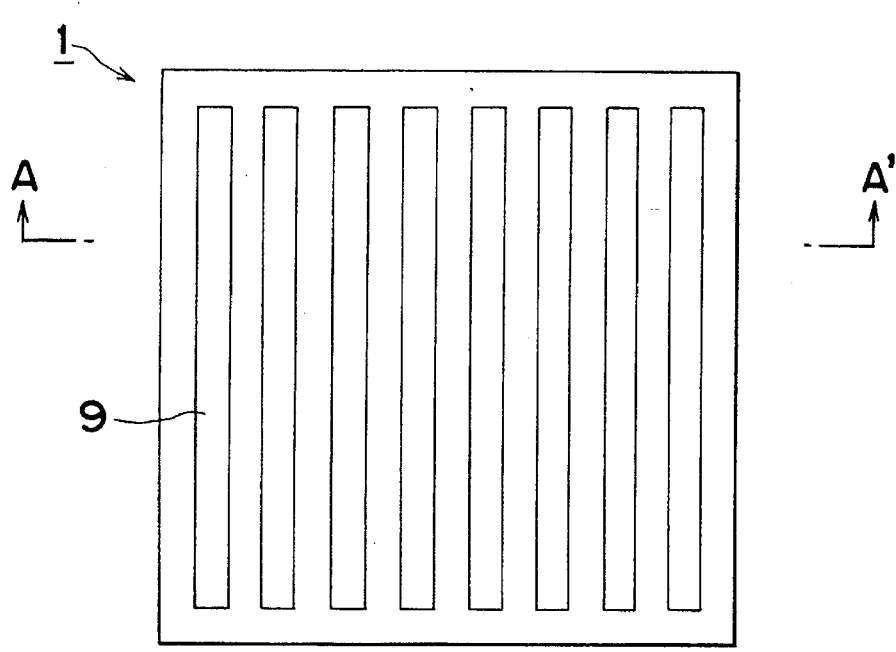
FIG. 1 is a plane figure of a light modulation device according to the first embodiment of the present invention.
Figure 2:
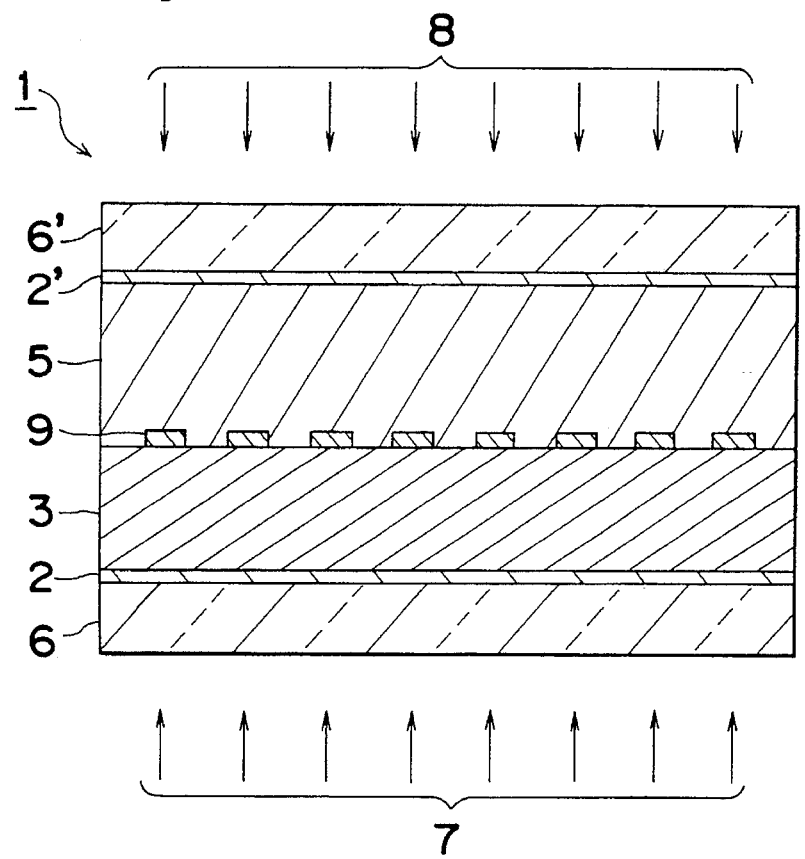
FIG. 2 is a cross section of the light modulation device at line A—A' in FIG. 2, FIG. 3 (a) shows an example of the input image to the light modulation device of the invention, FIG. 3 (b) illustrates the input method to the light modulation device of the invention, FIG. 3 (c) illustrates the output result of the light modulation device of the invention.

FIG. 1 is a plane figure of the first embodiment of a light modulation device according to the present invention, and FIG. 2 is a cross section of the light modulation device at line A—A' in FIG. 1.

This light modulation device 1 comprises a transparent electrode 2, a photoconductive layer 3, a conductive electrode 9, a light modulation layer 5, and a second transparent electrode 2' formed together in that order and sandwiched between a substrate 6 and 6' on each side.

The substrates 6 and 6' are formed of a material with good transmission characteristics to the input light 7 and the read light 8. A quartz substrate is used in this embodiment by way of example. Similarly, the transparent electrodes 2 and 2' are formed of ITO in this embodiment by way of example. The photoconductive layer 3 is preferably of a material which exhibits a drop in electrical resistance, i.e., an increase in electrical conductivity, when exposed to light. The photoconductive layer 3 is a 1 μm thick layer of amorphous silicon in this embodiment. The relationship between the light intensity I given to the amorphous silicon and the electrical conductivity σ is expressed by equation 1

$$\sigma \propto I^\gamma$$

$$s \mu I^\gamma \qquad (1)$$

where the electrical conductivity σ is proportional to the constant γ power of the incident light intensity I. To obtain the precise sum of the incident light intensity, constant γ is preferably approximately equal to 1.

The light modulation layer 5 performs a digitization function of the applied electrical field, and comprises, for example, ferroelectric liquid crystals sandwiched between alignment films. To extract vertical line segments in the input image, the conductive electrode 9 is formed by, for example, Al this film (~2000 Å) made by vapor deposition. The long side of the electrodes are designed to be parallel to the vertical direction as shown in FIG. 1.

When the input light 7 is not incident on the light modulation device 1, the electrical resistance of the photoconductive layer 3 is high compared with that of the light modulation layer 5. Therefore the voltage applied to the transparent electrodes 2 and 2' of the light modulation device 1 is applied primarily to the photoconductive layer 3. When light is incident on the photoconductive layer 3, the electrical conductivity σ increases (the electrical resistance decreases) according to the incident light intensity I, and the field strength applied to the light modulation layer increases in accordance with the laws of voltage distribution.

To modulate the read light 8 incident on the light modulation layer 5 where the conductive electrode 9 is present, the sum of the incident light intensity to that part of the photoconductive layer 3 must exceed a predetermined threshold value. This is because the conductive electrode 9 is formed between the photoconductive layer 3 and the light modulation layer 5 in this light modulation device 1, and areas in which the conductive electrode 9 is present become the same potential. In other words, if the vertical line segments in the input image are longer than a specific length, the read light 8 incident on that part will be modulated. It is preferable for the conductive electrode 9 to be formed by vapor deposition of a metal such as aluminum to have high optical reflectivity. Therefore, if the sum of the input light to the photoconductive layer 3 where the conductive electrode 9 is also present exceeds a specific threshold value, the read light 8 can be modulated and output as reflected light. Line segment information in the input image can thus be obtained by focusing on that part of the read light 8 corresponding to the position of the conductive electrode 9.

Figure 23:
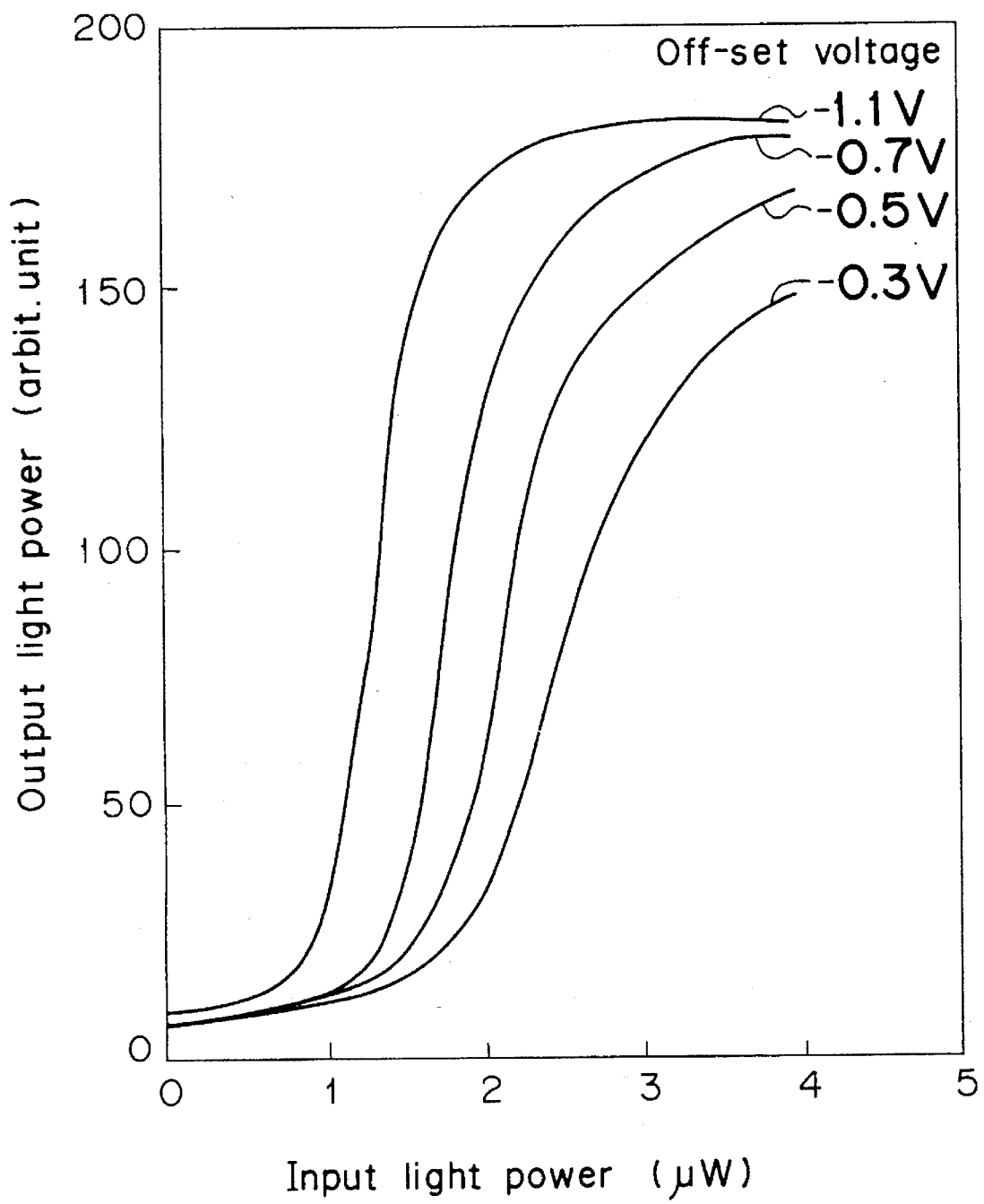
FIG. 23 is a graph of one example of the light modulation characteristics of the light modulation device according to the present invention.
Figure 24:
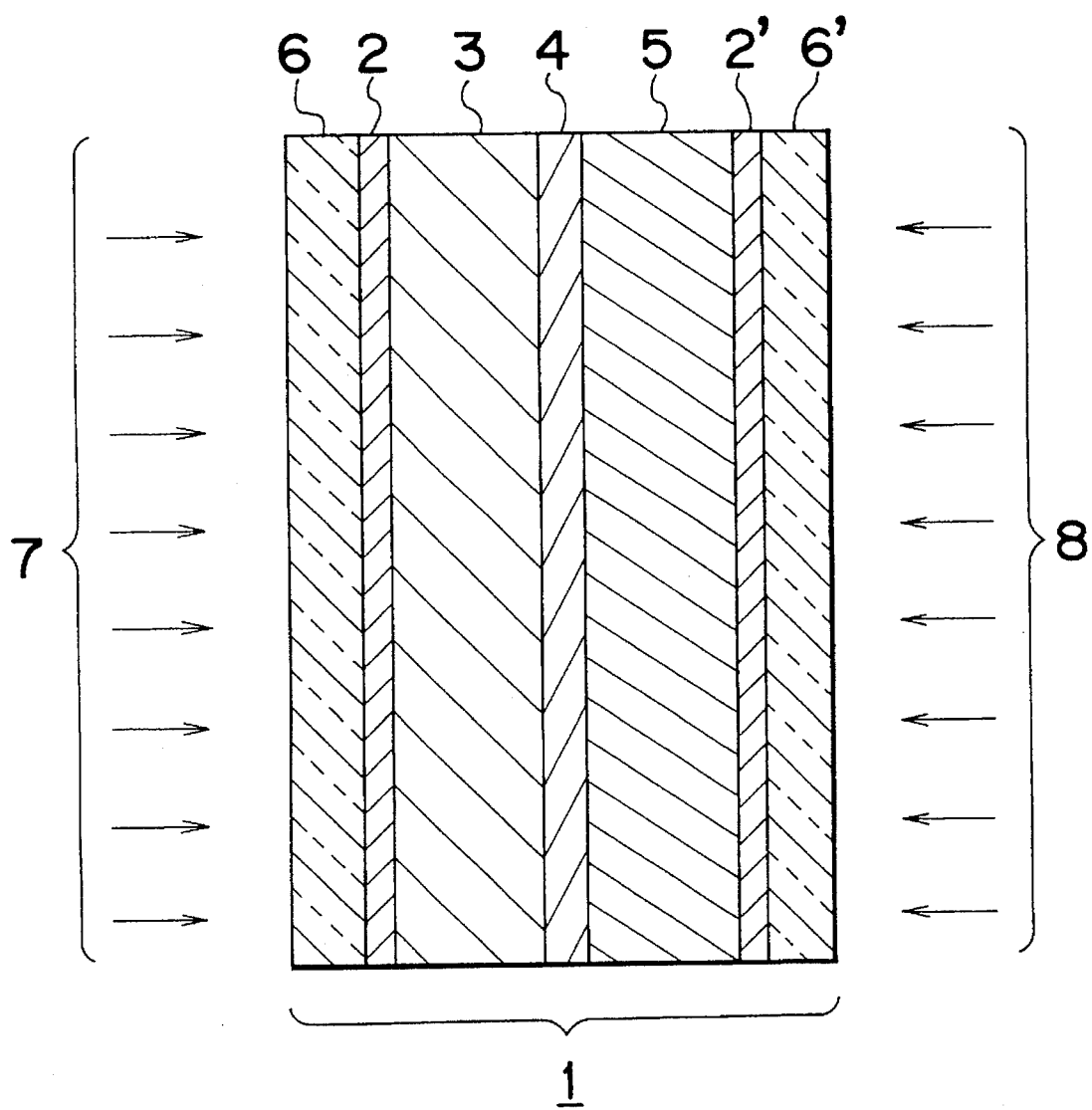
FIG. 24 is a cross section of a conventional light modulation device.

FIG. 23 is a graph of the light modulation characteristics of the light modulation device 1. It is to be noted that the threshold value can be adjusted by changing the offset voltage which is applied to the light modulation device 1.

Input of a letter image to the light modulation device 1 is described below with reference to FIG. 3.

Figure 3A:
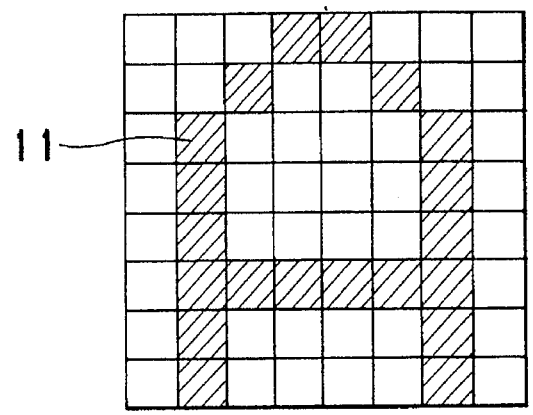

In this example the letter "A" represented by an 8×8 pixel matrix is used. The letter shown in FIG. 3 (a) is first incident on the light modulation device 1 comprising a pattern of eight parallel electrodes as shown in FIG. 3 (b). The electrodes which can modulate read light 8 are the shaded ones 12 shown in FIG. 3(c). It is possible to adjust the threshold value of the device so as to modulate only when the long vertical line segment, as shown in FIG. 3(a), is included in a images. Thus, the vertical line segments included in the letter image can be extracted as image features.

SECOND EMBODIMENT

Figure 4:
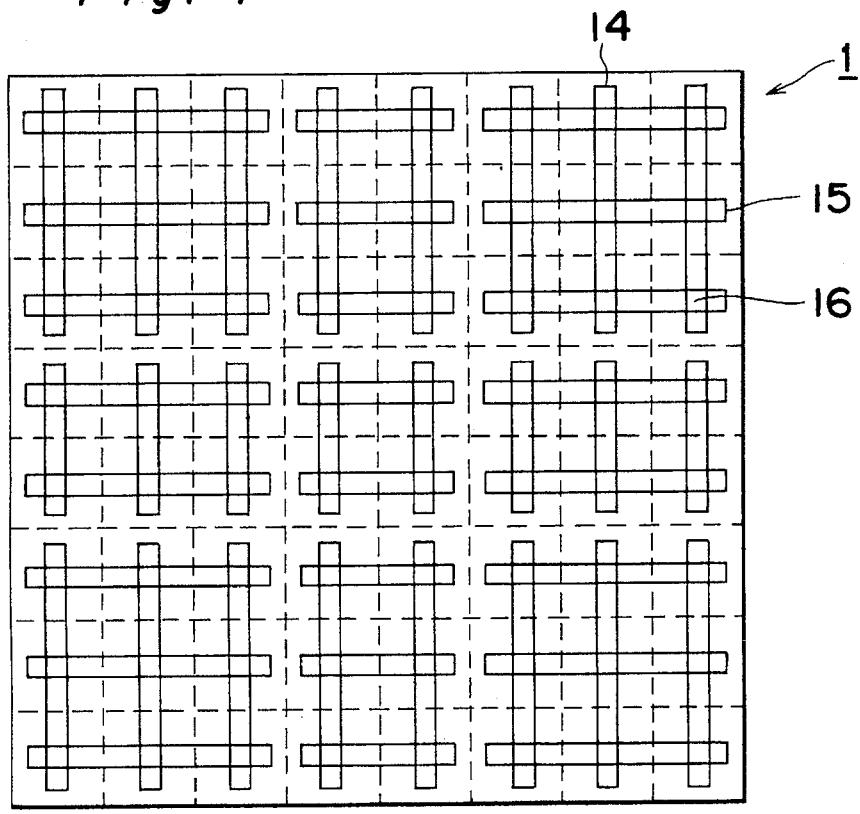
FIG. 4 is a plane figure of the second embodiment of a light modulation device according to the present invention.

FIG. 4 is a plane figure of the second embodiment of a light modulation device according to the present invention. This embodiment is basically constructed in the same way as the first embodiment above. It differs in that the conductive electrode 9 comprises plural vertically continuous 14 and horizontally continuous electrode patterns 15. In addition, these patterns are electrically insulated by an insulation layer provided where the two patterns intersect 16.

Figure 5:
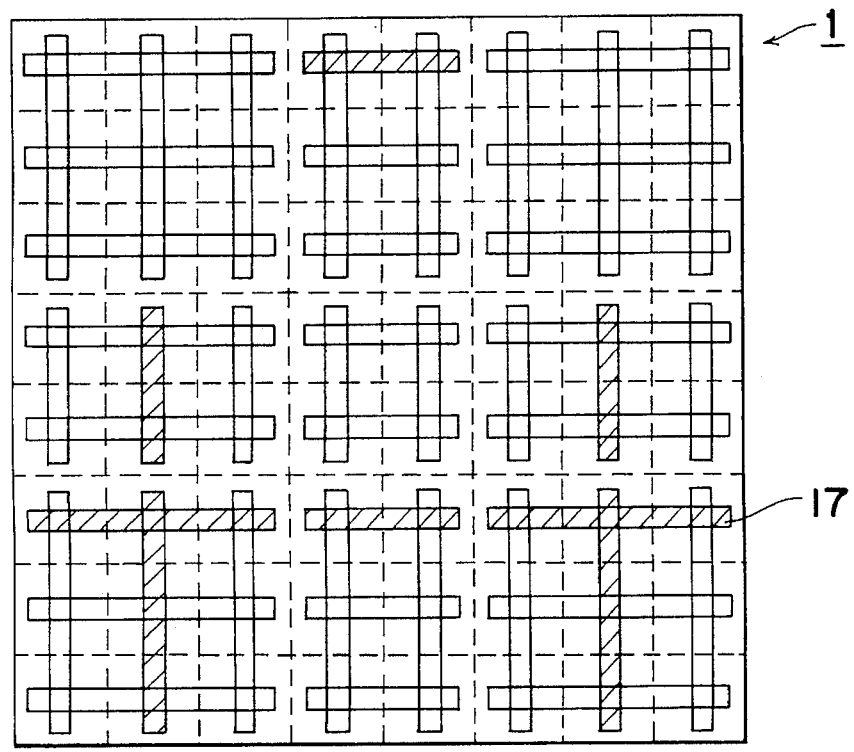
FIG. 5 illustrates the output result of the light modulation device of the invention, FIG. 6 (a) is a plane figure of the plural parallel electrode patterns in a light modulation device according to the present invention, FIG. 6 (b) is a plane figure of the electrode pattern with extracted line components.

The light modulation device 1 according to this embodiment is divided into 64 regions indicated by the broken lines in FIG. 4. The offset voltage is adjusted such that the read light is modulated only when the light is incident on at least two adjacent regions. It is therefore possible for the electrode pattern indicated by the shaded areas 17 in FIG. 5 to modulate the read light when, for example, the letter "A" shown in FIG. 3 (a) is incident on the light modulation device 1. Thus, line segments in each direction can be separately extracted by the different electrode patterns because the electrodes with different directions are electrically insulated from each other.

THIRD EMBODIMENT

Described next is an alternative embodiment of the light modulation device in which the conductive electrode 9 is a combination of plural parallel electrode patterns of which the long directions are formed parallel to each other or intersecting at 45° or 90°.

Figure 6A:
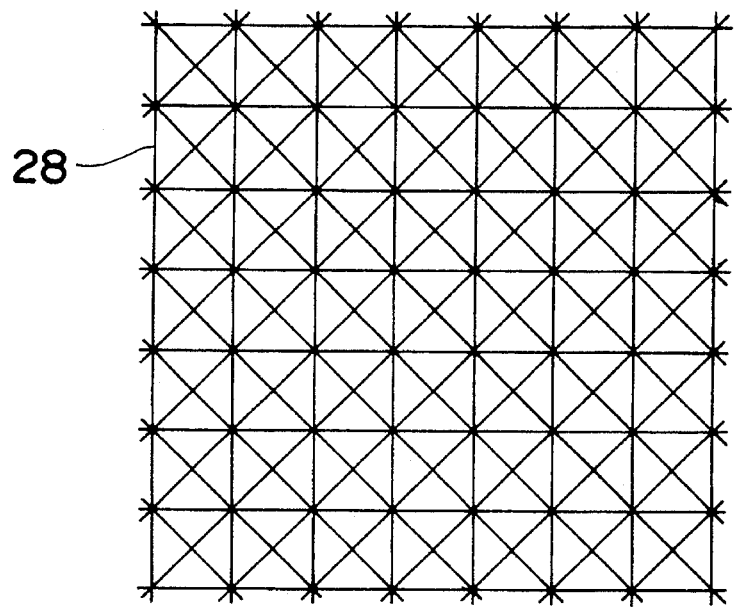
Figure 6B:
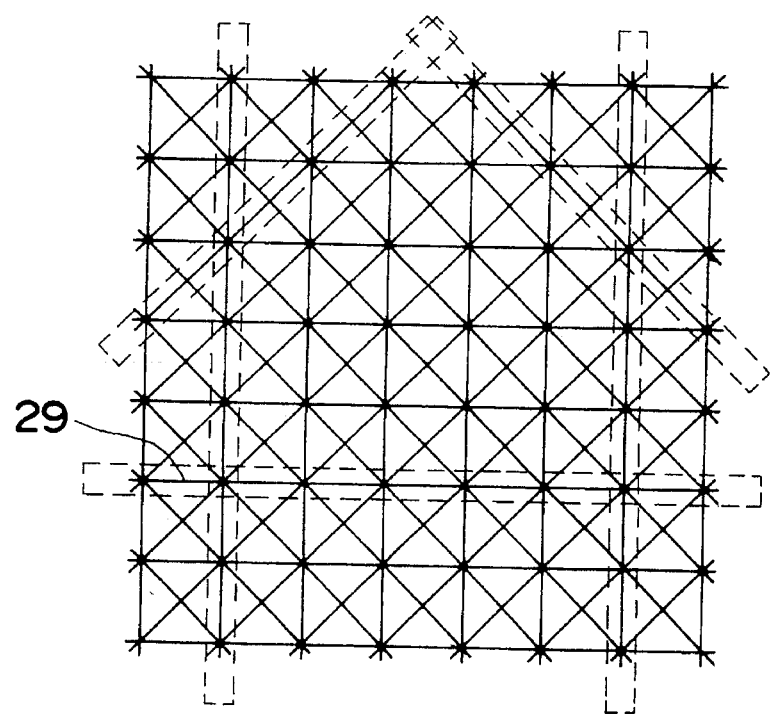

FIG. 6 (a) is a plane figure of the light modulation device. The parallel electrode patterns 28 intersect with each other at 90° or diagonally 45° right or left. Note also that the electrode patterns 28 are electrically insulated from each other where the patterns overlap.

Line segments of four directions in the input image can be separately extracted with this light modulation device. For example, when the letter "A" shown in FIG. 3 (a) is incident on the light modulation device 1, the light modulation layer 5 operates only at those parts of the electrode patterns 29 enclosed by a broken line in FIG. 6 (b). Thus, line segments in each of these directions included in the input image can be extracted as image features.

FOURTH EMBODIMENT

Figure 7:
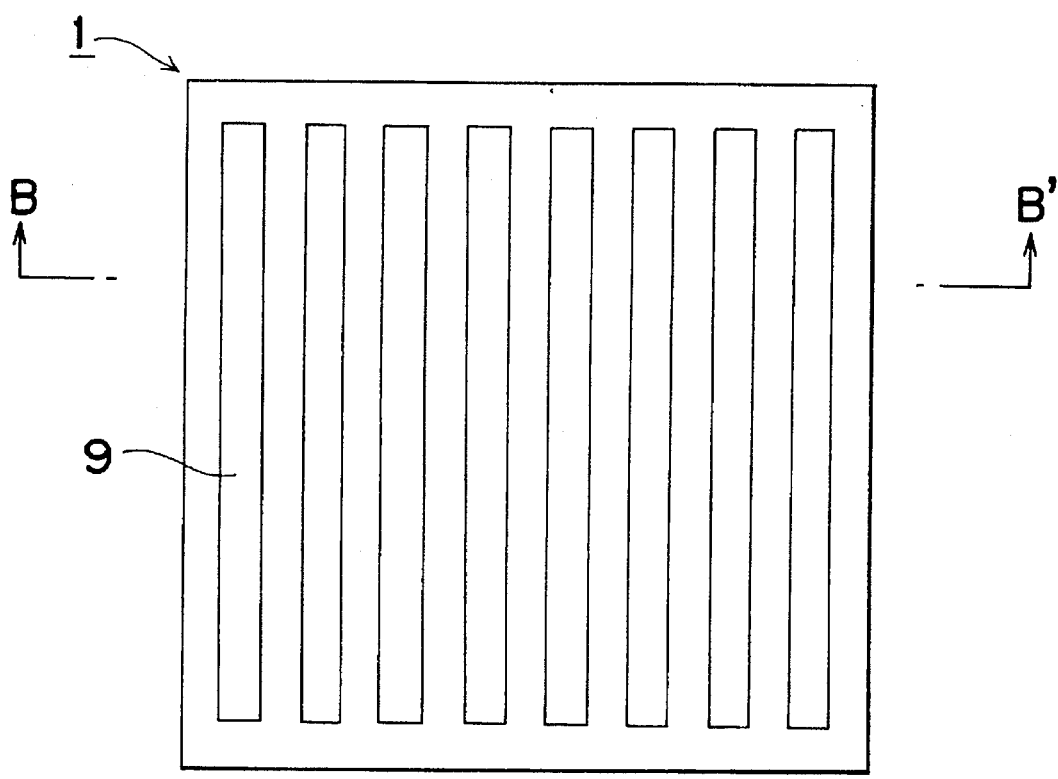
FIG. 7 is a plane figure of the light modulation device according to an alternative embodiment of the invention.
Figure 8:
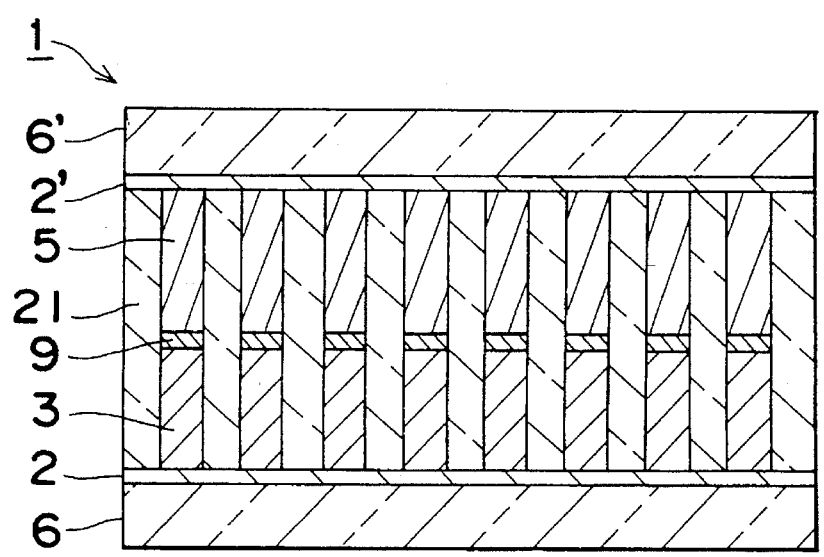
FIG. 8 is a cross section of the light modulation device at line B—B' in FIG. 7.

FIG. 7 is a plane figure of the light modulation device according to an alternative embodiment of the invention, and FIG. 8 is a cross section of the light modulation device at line B—B' in FIG. 7.

The light modulation device 1 according to this embodiment is similar to the first and second embodiments and comprises a transparent electrode 2, a photoconductive layer 3, a conductive electrode 9, a light modulation layer 5, and a second transparent electrode 2' formed together in that order and sandwiched between a substrate 6 and 6' on each side. It differs, however, in that the photoconductive layer 3 and the light modulation layer 5 have the same two-dimensional pattern distribution as the conductive electrode 9, and a transparent insulation layer 21 is provided at the discontinuous parts of the photoconductive layer 3 and light modulation layer 5. The light modulation layer 5 exhibits a digitization function against the applied field, and consists, for example, of ferroelectric crystals with alignment layer.

Figure 9:
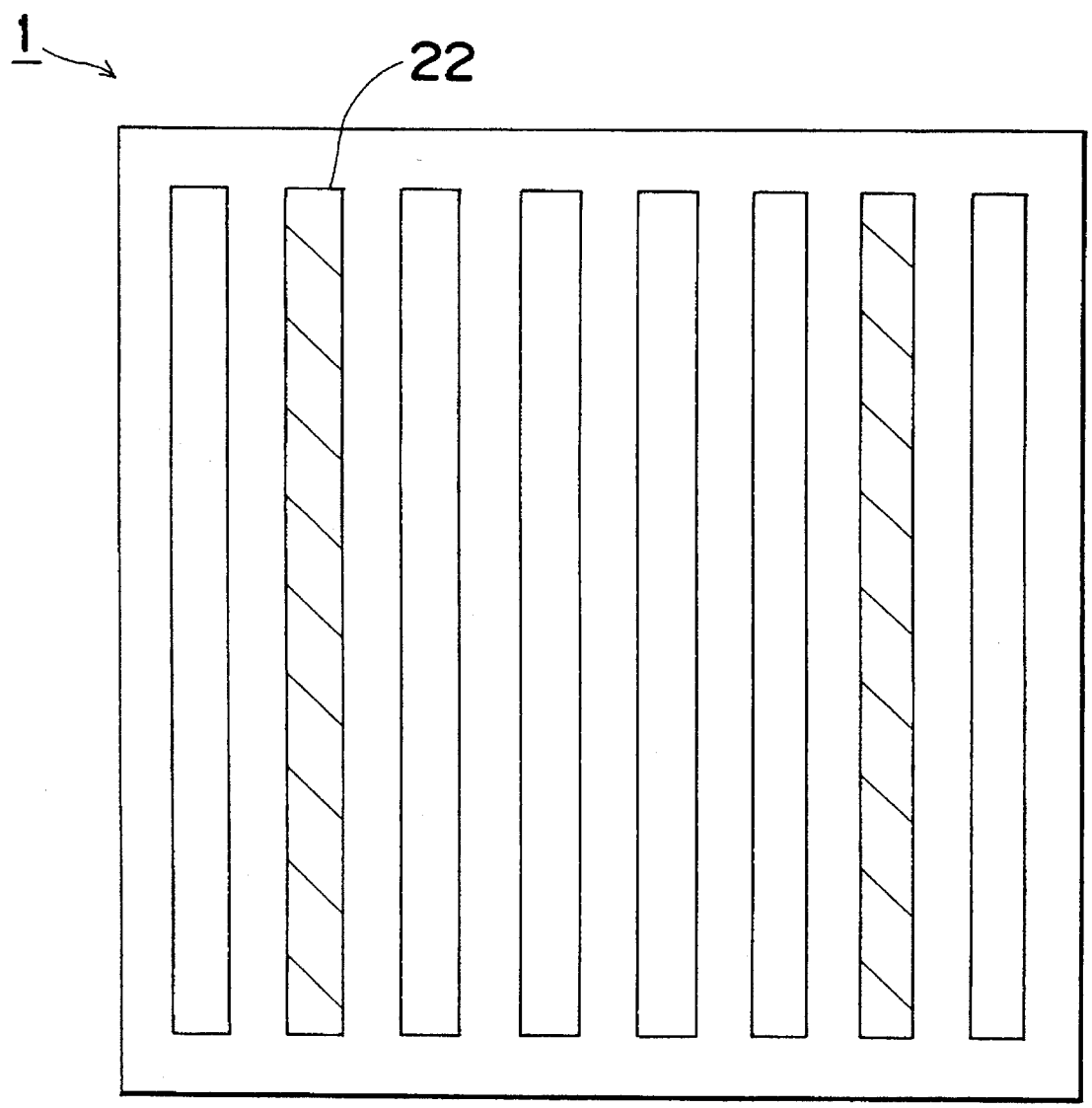
FIG. 9 illustrates the output result of the light modulation device of the invention.

The basic operation is also the same as that of the first and second embodiments: the light modulation layer 5 can modulate read light only when the sum of light intensity incident on its corresponding photoconductive layer 3 exceeds a threshold value. For example, when the letter "A" shown in FIG. 3 (a) is incident on the light modulation device 1, the light modulation layer 5 operates only at those parts indicated by the shaded areas 22 in FIG. 9. Thus, vertical line segments included in the input image can be extracted as image features.

It is to be noted that by providing four light modulation devices (a first light modulation device with plural vertically long electrodes, a second light modulation device with plural horizontally long electrodes, a third light modulation device with plural electrodes leaned to the left at 45° from the vertical electrodes of the first light modulation device, and a fourth light modulation device with plural electrodes leaned to the right at 45° from the vertical electrode of the first light modulation device), overlapping in a cascaded manner, an input image from the photoconductive layer side of the first light modulation device can be extracted, wherein four kinds of line segments included in the input image can be extracted as image features.

FIFTH EMBODIMENT

An image recognition method according to the present invention is described next. It processes an input image by means of a neural network which uses information of the line segments extracted from the input image by the light modulation device.

Figure 10:
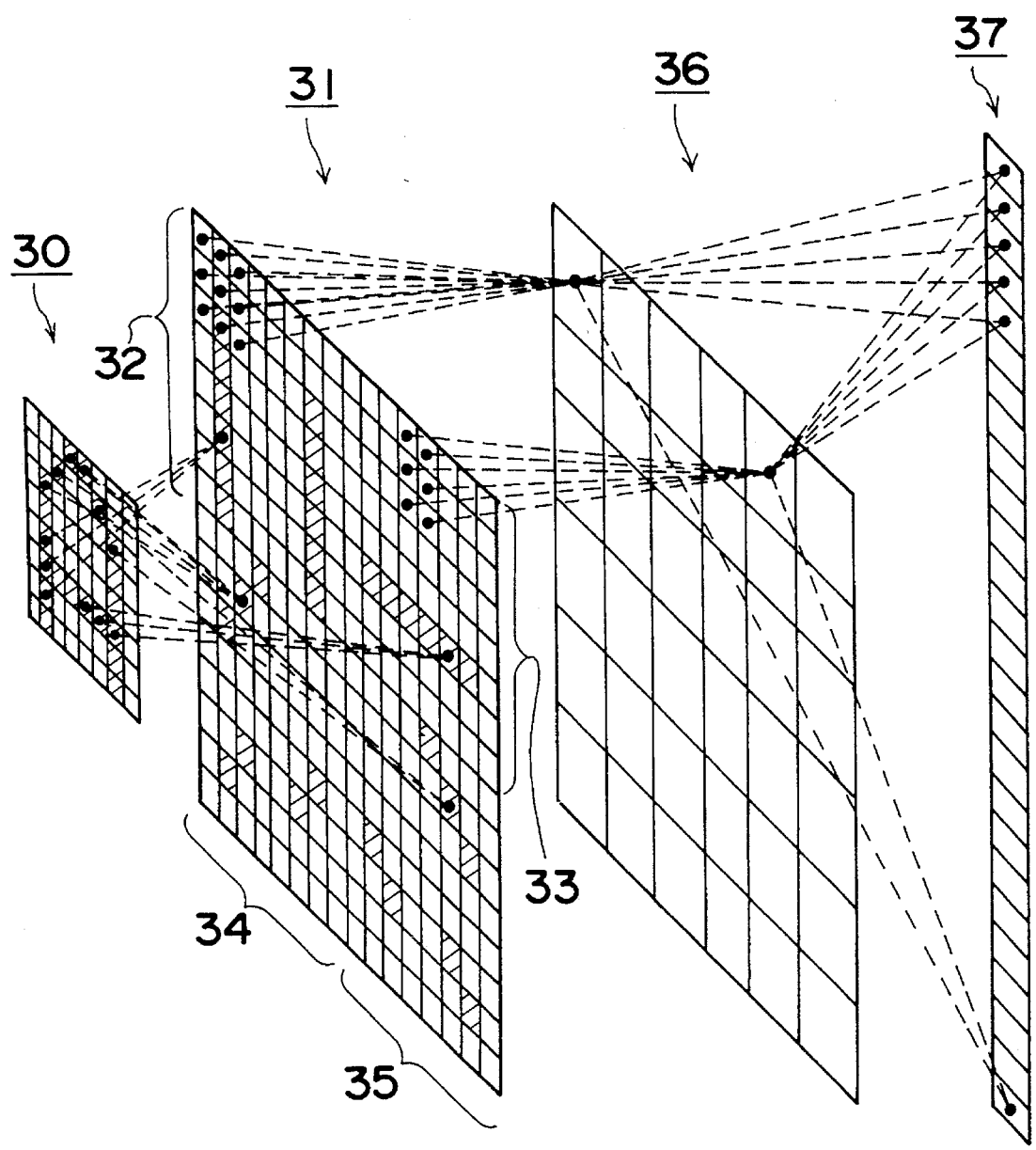
FIG. 10 is a conceptual illustration of the neural network model used in the image recognition method according to the present invention.

FIG. 10 is a conceptual illustration of the neural network model used in the image recognition method according to the present invention.

This model has four two-dimensional neuron layers, the neurons performing the same input/output operation as the nerve cells of the human brain. This neural network model recognizes an image by extracting four kinds of line segments (vertical, horizontal, and right- and left-descending slope), and by integrating these lines so as to extract information about the existing position or degree (length) of those lines. As a result, for example, this neural network model can recognize hand-written characters.

The detail operation of this neural network is described next.

Figure 3B:
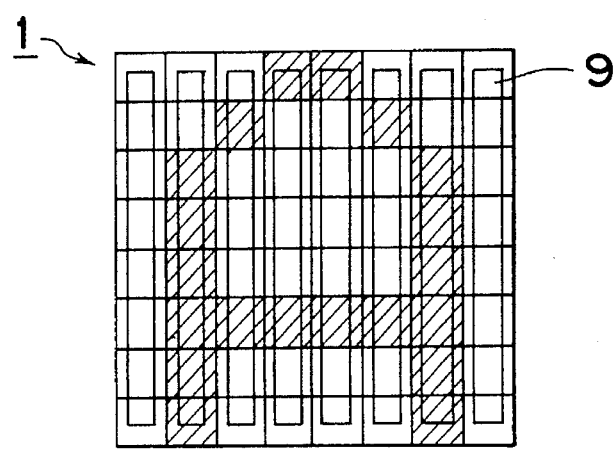
Figure 3C:
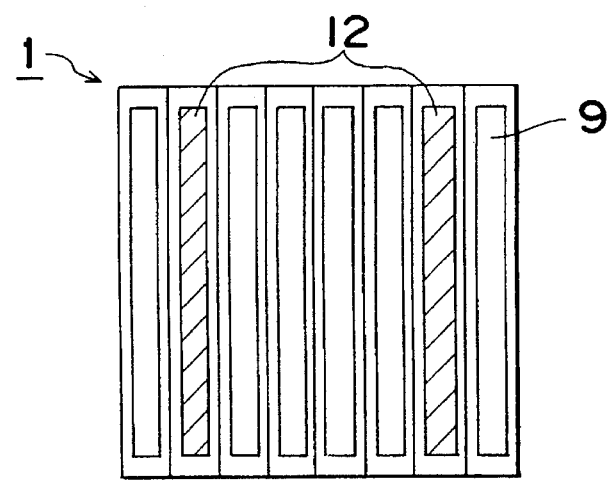

The input layer 30 is an 8×8 two-dimensional array of neurons, and 8×8 bit image as shown in FIG. 3 (a) is given.

The second layer 31 is subdivided into four regions 32–35, each of which is a two-dimensional array of 8×8 elements, and thus comprises 256 neurons in a 16×16 matrix. Each of the regions 32–35 in the second layer is connected to the neurons of the input layer 30 in a specific way corresponding to line segments of a specific direction in the input image. For example, each single neuron in region 32 is connected to the neuron in the same corresponding position in the input layer 30 and to the two adjacent neurons above and below. A neuron in region 32 can fire only when a vertical line segment is included in the corresponding position of the input image. Thus region 32 extracts vertical line segments in the input image.

Similarly, the neurons of region 33 are connected to the neuron in the same corresponding position in the input layer 30 and to the two adjacent neurons on the right and left sides, the neurons of region 34 are connected to the corresponding neuron and to the neurons diagonally adjacent on a left-descending slope, and the neurons in the bottom right region 35 are connected to the corresponding neuron and to the neurons diagonally adjacent on a right-descending slope.

In addition, each of the regions (32–35) of the second layer 31 is divided into nine subregions. These subregions are equivalent to dividing the two-dimensional input bit image into nine parts. In addition, all neurons in each subregion are connected to the same single neuron in the third layer 36. A neuron in the third layer 36 can fire only when its connected neurons in the subregion of the second layer 31 are firing.

Therefore, the direction and existing position of the line segment extracts or a neuron in the third layer 36 depends upon its connecting subregion in the second layer 31. In other words, the output state of each neuron in the third layer 36 indicates the direction, existing position, and length of the corresponding line segments in the two-dimensional bit image given to the neural network.

Each of the neurons in the third layer 36 is connected to all of the neurons in the fourth layer 37. The sum of the input signals to each neuron in the fourth layer 37 is obtained, and only one neuron with the largest value can fire. For example, to recognize the 26 alphabet letters, the fourth layer 37 comprises 26 neurons, and each corresponds to a certain letter. The letter corresponding to the fired neuron is therefore the result of the recognition. The synaptic weight between third and fourth layer are trained using an orthogonal learning method, and all other synaptic weight are fixed positions constant value.

Figure 11:
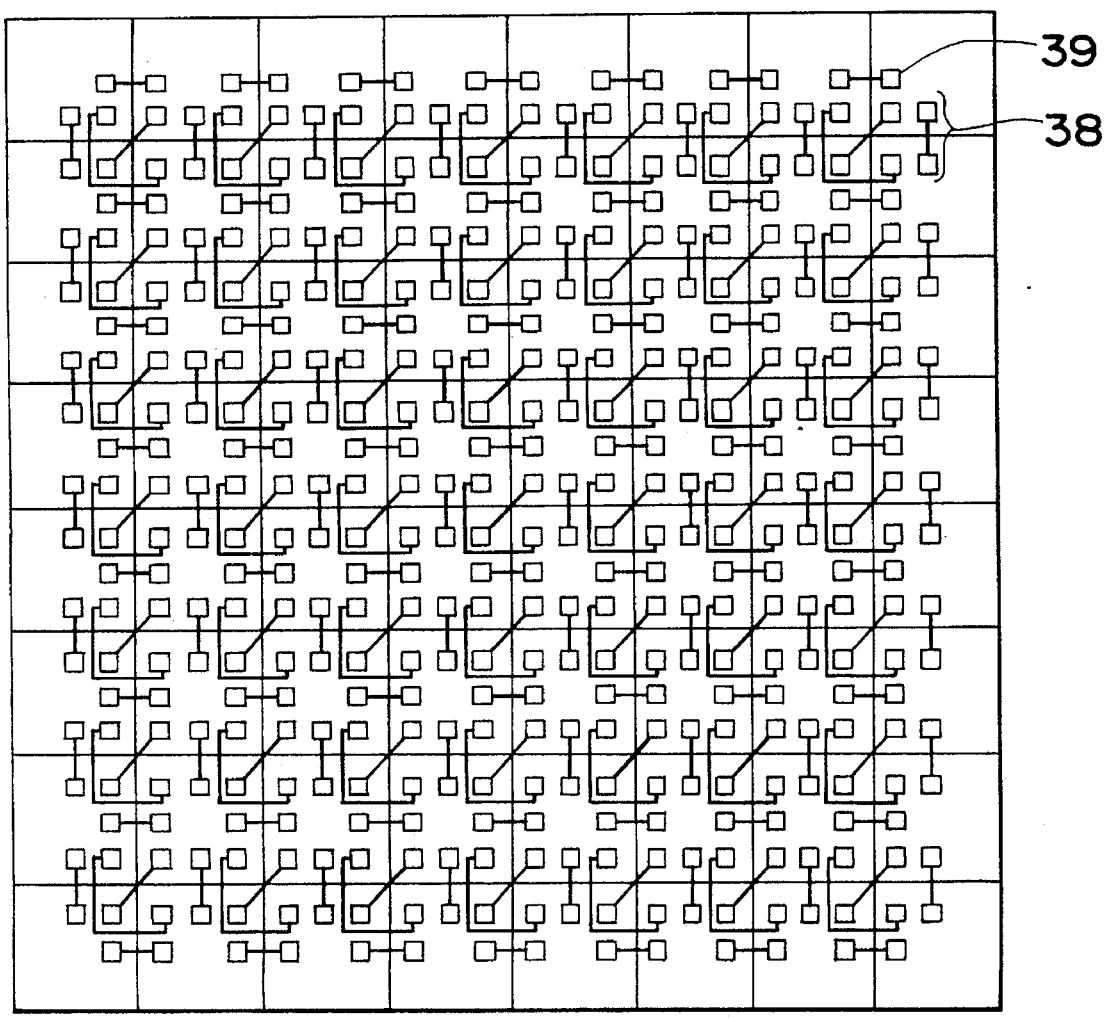
FIG. 11 is a plane figure of the light modulation device used in the neural network model used by the image recognition method of the present invention.

FIG. 11 is a plane figure of the light modulation device which extracts four kinds of line segments of the input image, and corresponds to the second layer in the above neural network model.

The structure of this light modulation device is the same as that of the first embodiment above, and comprises a transparent electrode 2, a photoconductive layer 3, a conductive electrode 9, a light modulation layer 5, and a second transparent electrode 2' formed together in that order and sandwiched between a substrate 6 and 6' on each side. The electrode pattern 38 consists of two unit electrodes 39 which are electrically connected.

An amorphous silicon is used for the photoconductive layer 3, and ferroelectric crystals for the light modulation layer 5. As in the first embodiment, the light modulation layer 5 modulates the read light 8 only at those parts where its corresponding photoconductive layer 3 is illuminated by sufficient light (exceeding threshold value). The modulated read light 8 is then reflected by the conductive electrode 38.

As shown in FIG. 11, the light modulation device can thus be divided into a total 64 areas in an 8×8 matrix. Each area corresponds to one region of the input character pattern, for example the letter "A" shown in FIG. 3 (a).

It is assumed that the letter "A" shown in FIG. 3 (a) is incident on the light modulation device. This character pattern is displayed on a transparent liquid crystal display, for example, and the shaded areas 11 in FIG. 3 (a) pass light through. The threshold value θ of the modulation device is adjusted to satisfy the following equation:

$$I \times S < \theta < 2 \times I \times S$$

where I denotes light energy per unit area of light passing area 11, and S is the area of the unit electrode 39 of the light modulation device shown in FIG. 11.

In other words, in order for the light modulation device in FIG. 11 to modulate the read light, two electrically connected unit electrodes 39 must be illuminated by the light. For example, for a unit electrode connected vertically across adjacent regions to modulate, light must be given to two vertically adjacent areas. The same is true for horizontally and diagonally connected electrodes.

Figure 12:
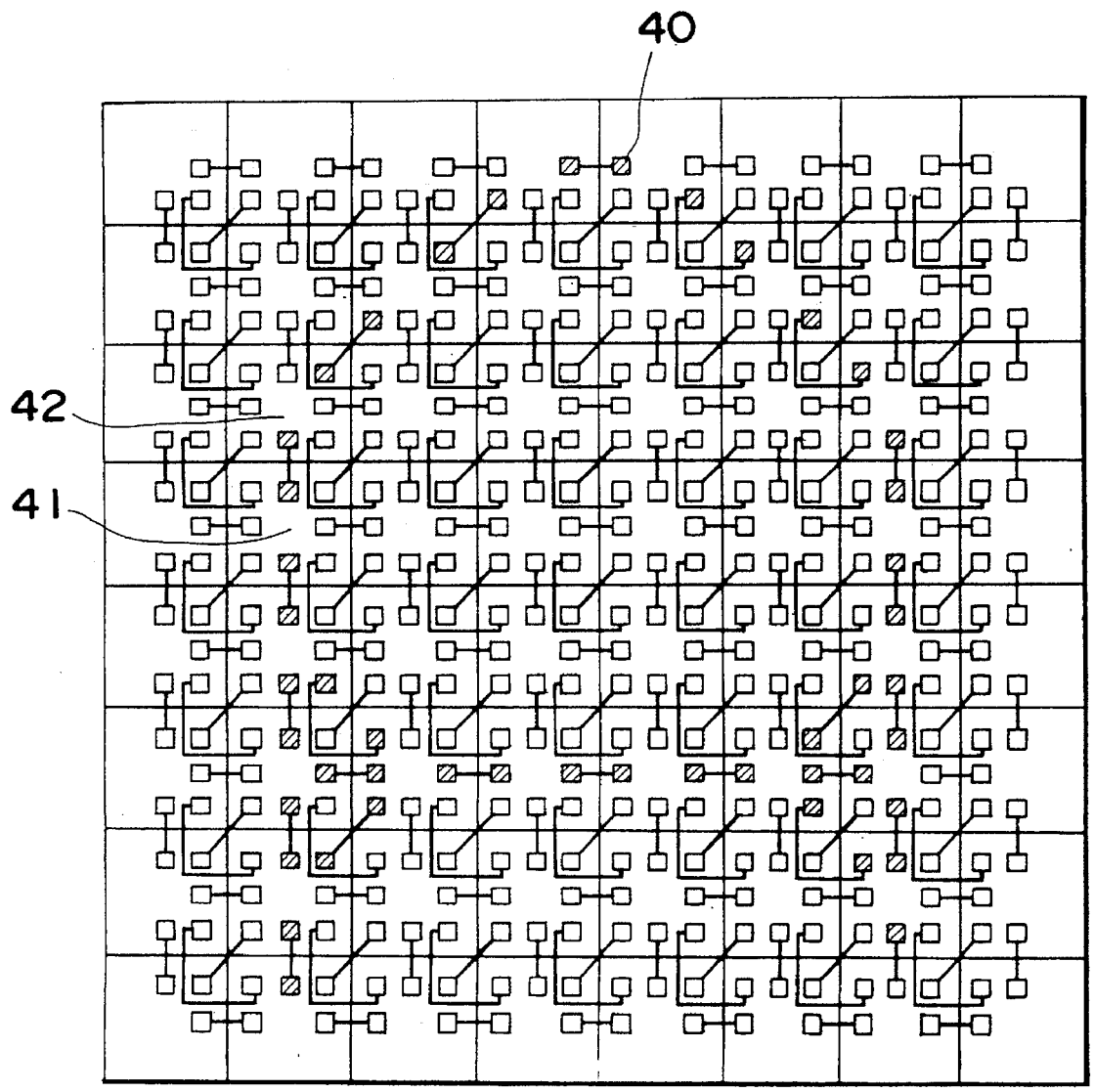
FIG. 12 illustrates the output result of image recognition using the image recognition method of the present invention.

Therefore, when a character pattern such as that shown in FIG. 3 (a) is given, the light modulation layer will only modulate the read light 8 at the shaded electrode 40 in FIG. 12. Thus, by paying attention to the electrode of each area of the light modulation device, it can be determined which line segment is included in the input pattern. For example, since only the unit electrodes connected across vertically adjacent areas are modulating at area 41 in FIG. 12, it is known that this part comprises a vertical line segment in the character pattern. Furthermore, because the electrodes connected vertically and left diagonally in area 42 modulate, it is revealed that this part comprises a vertical and a diagonal line segment in the character pattern.

As previously described, the output result of this light modulation device can express the output results of the second layer in the neural network model shown in FIG. 10.

To achieve the functions of the third and fourth layers in the neural network model shown in FIG. 10, the modulation results of the light modulation device are detected with a CCD camera, and given to a computer.

By dividing the light modulation device into nine subregions and calculating the number of unit electrodes modulating the read light 8 in each subregion, the output of the neuron of the third layer in FIG. 10 can be obtained. The connection between the third and fourth layers is achieved in computer software.

Figure 13:
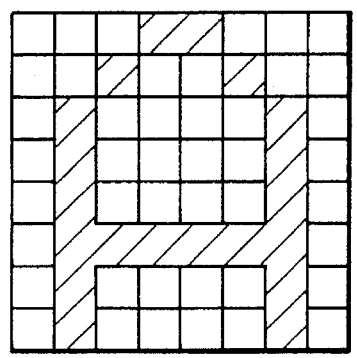
FIG. 13 illustrates some character patterns recognized by the image recognition method of the present invention, 14
Figure 13:
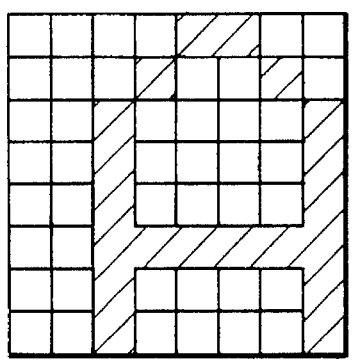
Figure 13:
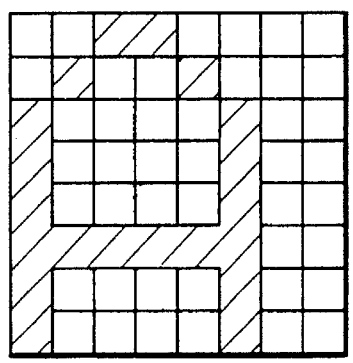
Figure 13:

The above recognition device can correctly recognize character patterns as shown in FIG. 13. This demonstrates that the neural network model used in this recognition device provides high recognition ability against shifted patterns.

SIXTH EMBODIMENT

Figure 14:
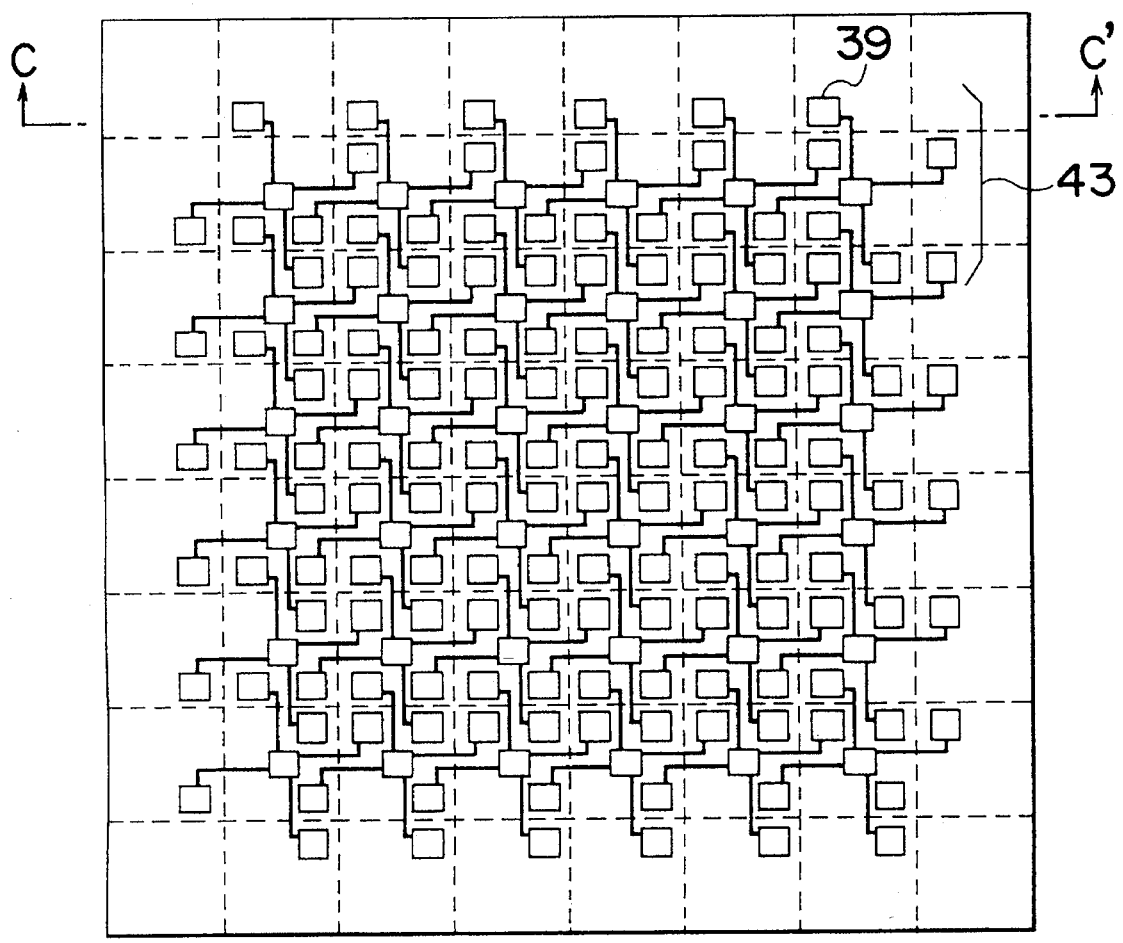
FIG. 14 is a plane figure of the light modulation device according to an alternative embodiment of the invention.
Figure 15:
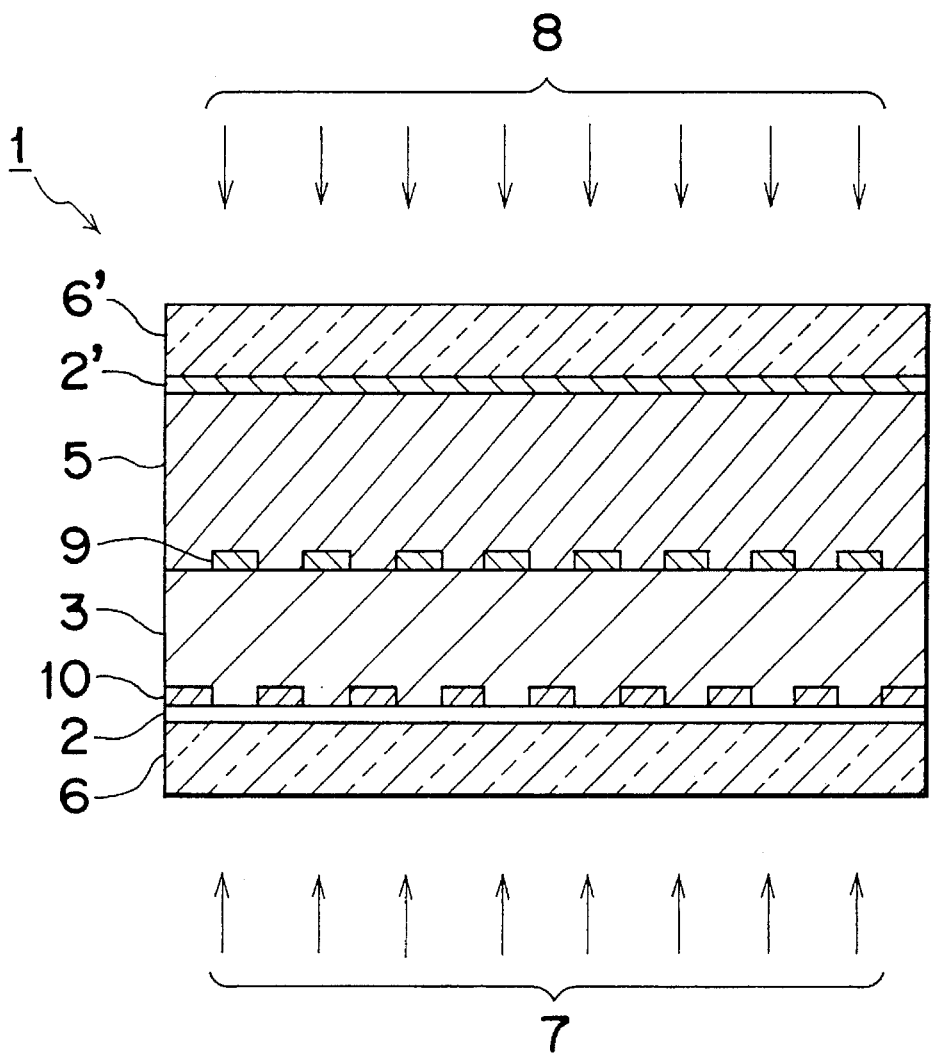
FIG. 15 is a cross section of the light modulation device at line C—C' in FIG. 14.

FIG. 14 is a plane figure of the light modulation device according to an alternative embodiment of the invention, and FIG. 15 is a cross section of the light modulation device at line C—C' in FIG. 14.

This light modulation device 1 comprises a transparent electrode 2, a light shield layer 10, a photoconductive layer 3, a conductive electrode 9, a light modulation layer 5, and a second transparent electrode 2' formed together in that order and sandwiched between a substrate 6 and 6' on each side. As in the fifth embodiment described above, the light modulation device of this embodiment is divided into 64 regions based on the regularity of the electrode structure. The electrode pattern 43 consist of five unit electrodes 39 which are electrically connected.

The light shield layer 10 prevents incident light from illuminating the light modulation layer where a unit electrode 39 is not also present. The light modulation layer 5 performs a digitization function of the applied field, and comprises, for example, ferroelectric liquid crystal sandwiched between alignment layers. Thus, as in the fifth embodiment of the light modulation device, the light modulation layer 5 can modulate the read light 8 only when all of parts of photoconductive layer 3 which correspond to electrically connected fire electrode are illuminated at the same time. The modulated read light 8 is then reflected by the conductive electrode 43.

Figure 16:
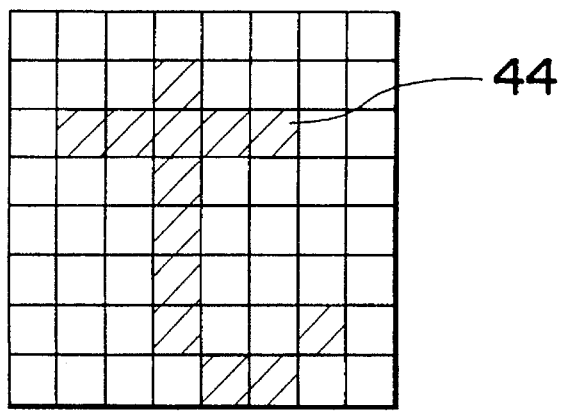
FIG. 16 shows an example of the input image to the light modulation device of the invention.

It is assumed that the letter "t" shown in FIG. 16 is given to the light modulation device. This character pattern is displayed on the transparent liquid crystal display, for example, and the shaded areas 44 in FIG. 16 pass light through. The threshold value θ of the modulation device is adjusted to satisfy the following equation:

$$4 \times I \times S < \theta < 5 \times I \times S$$

where I denotes light energy per unit area of light passing area 44, and S is the area of the unit electrode 39 of the light modulation device shown in FIG. 14.

Figure 17:
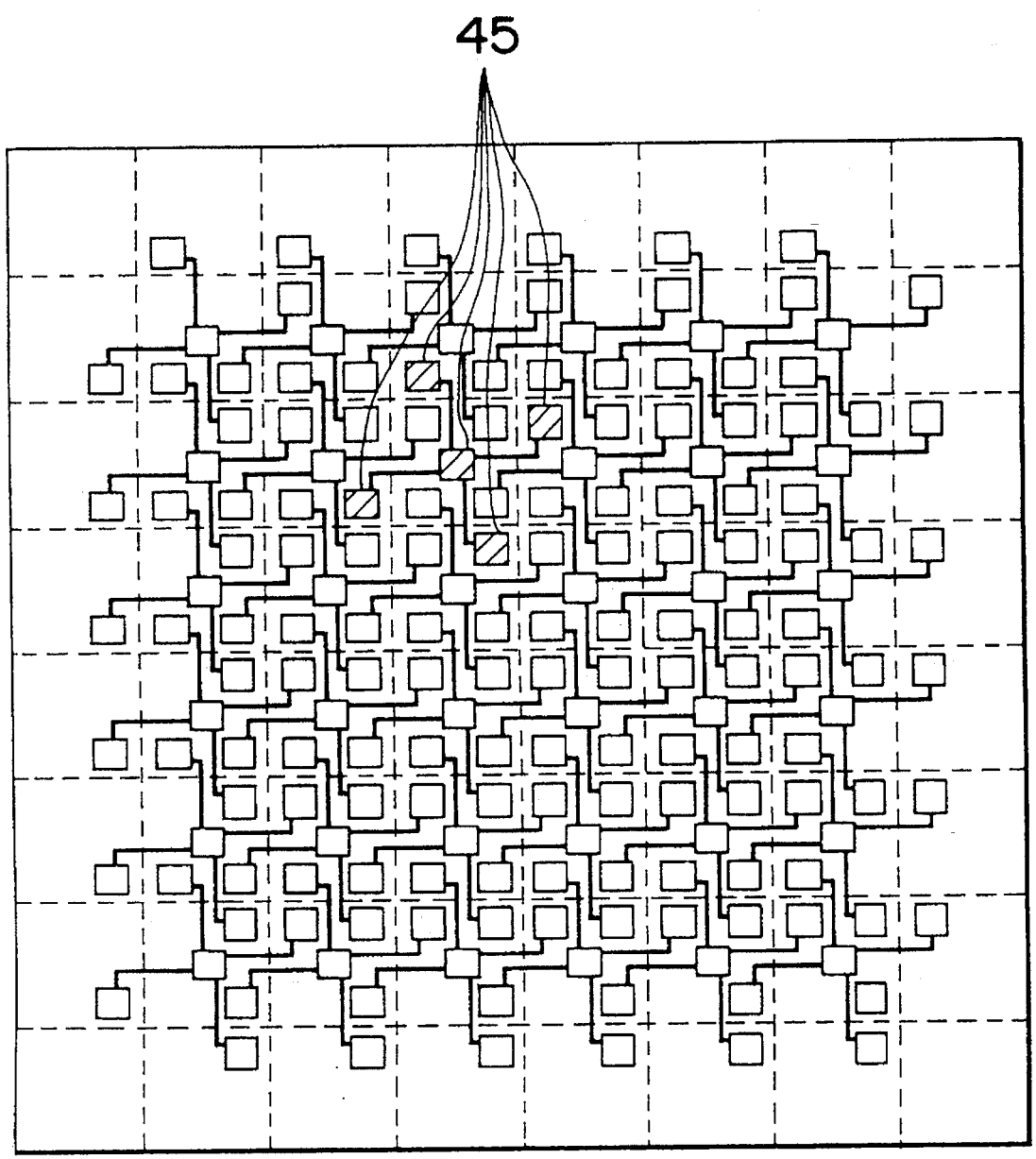
FIG. 17 illustrates the output result of the light modulation device of the invention.

Therefore, when the character pattern shown in FIG. 16 is input, the read light 8 is modulated by the light modulation device only at electrodes 45 in FIG. 17.

Thus, the light modulation device according to the present embodiment can extract such geometric shapes as "+" included in the image.

SEVENTH EMBODIMENT

Figure 18:
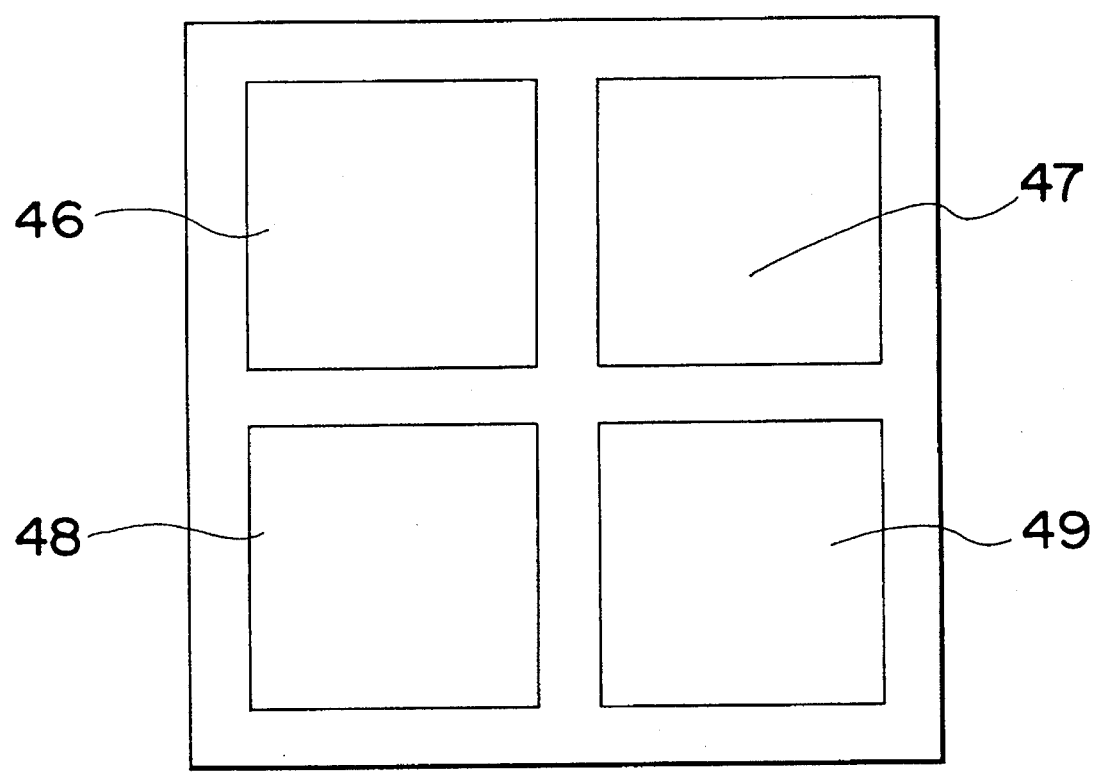
FIG. 18 is a plane figure of the light modulation device according to an alternative embodiment of the invention.
Figure 19:
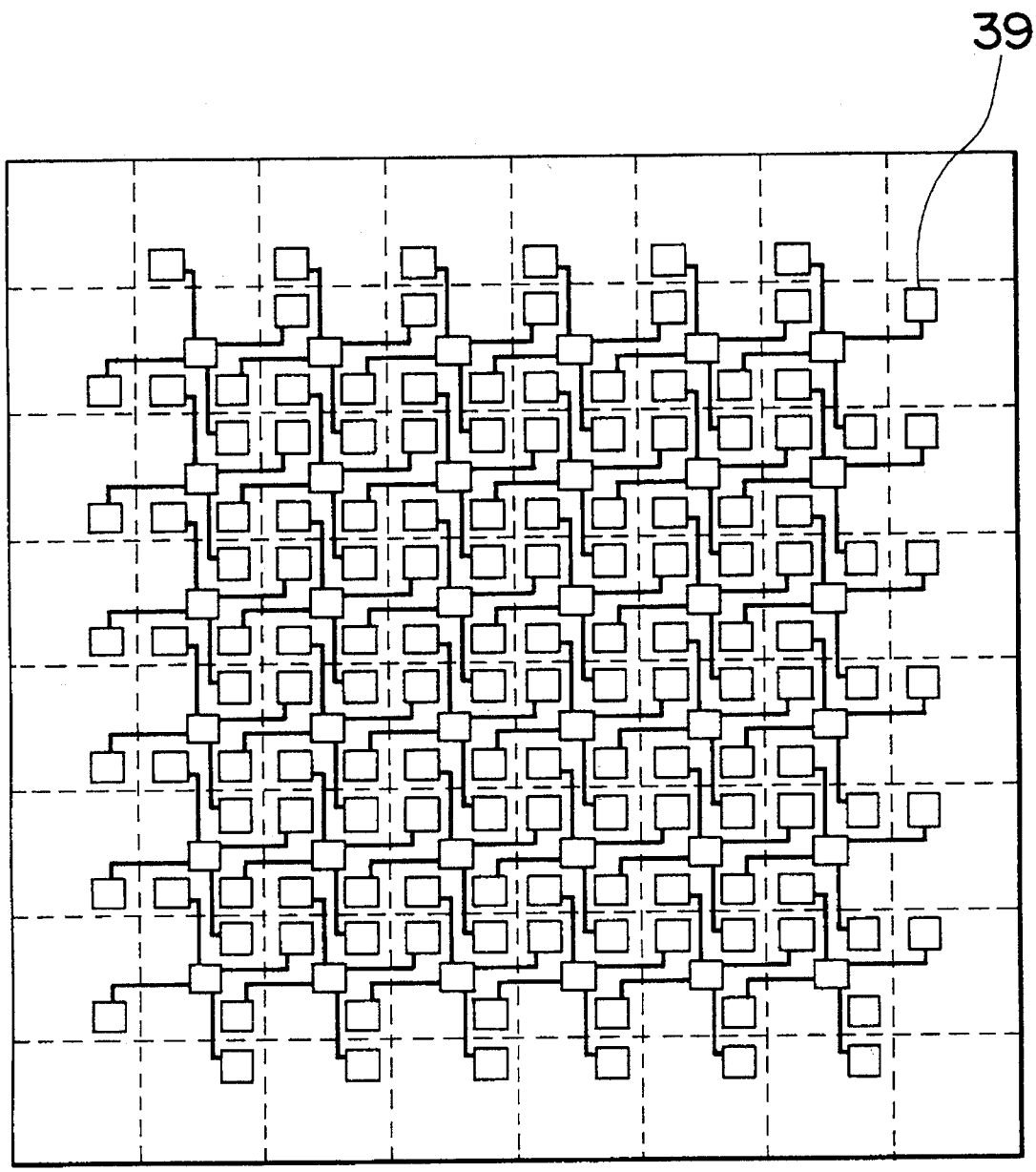
FIG. 19 is a detailed plane figure of area 46 in FIG. 18 for an alternative embodiment of the invention.
Figure 20:
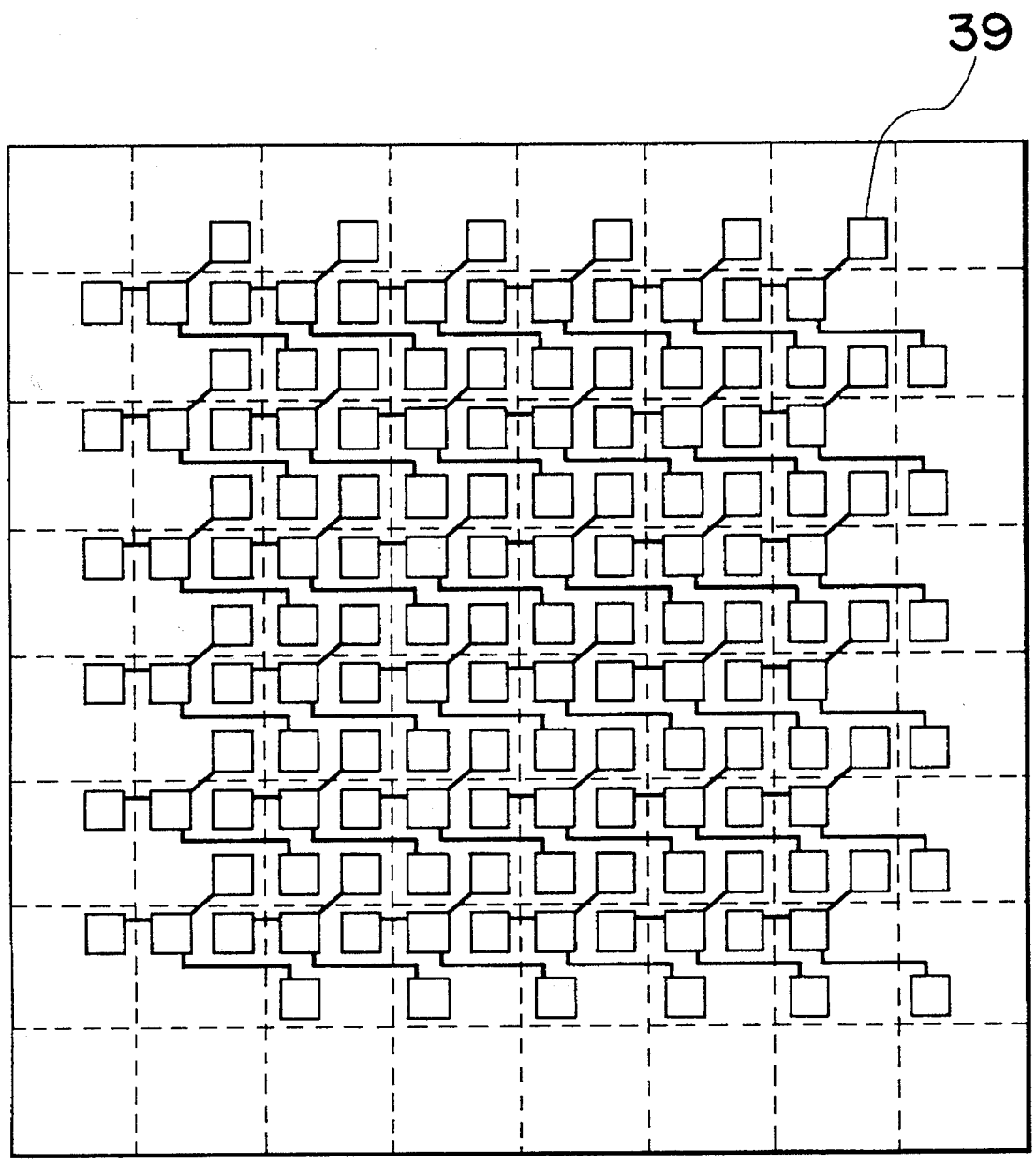
FIG. 20 is a detailed plane figure of area 47 in FIG. 18 for an alternative embodiment of the invention.
Figure 21:
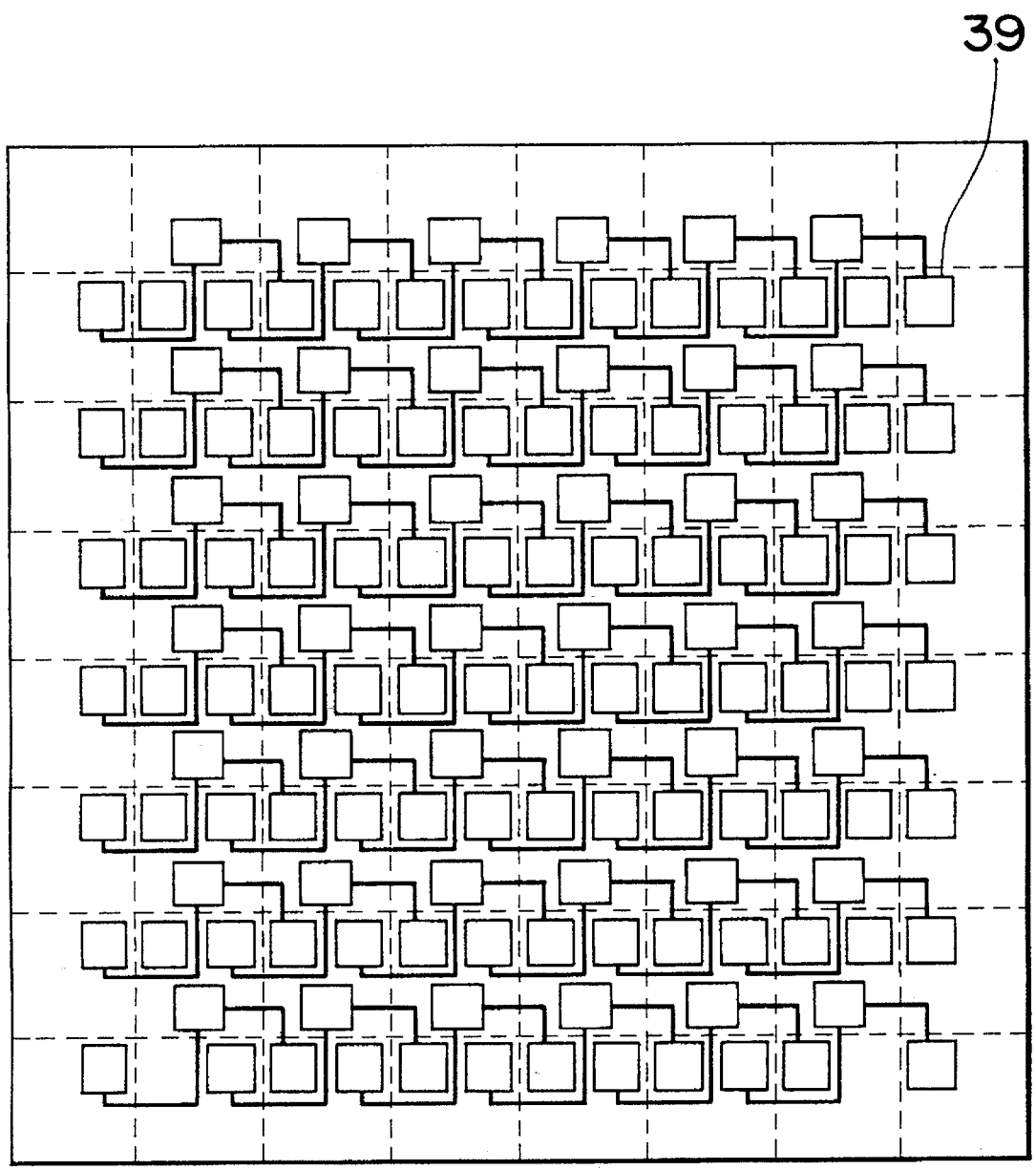
FIG. 21 is a detailed plane figure of area 48 in FIG. 18 for an alternative embodiment of the invention.
Figure 22:
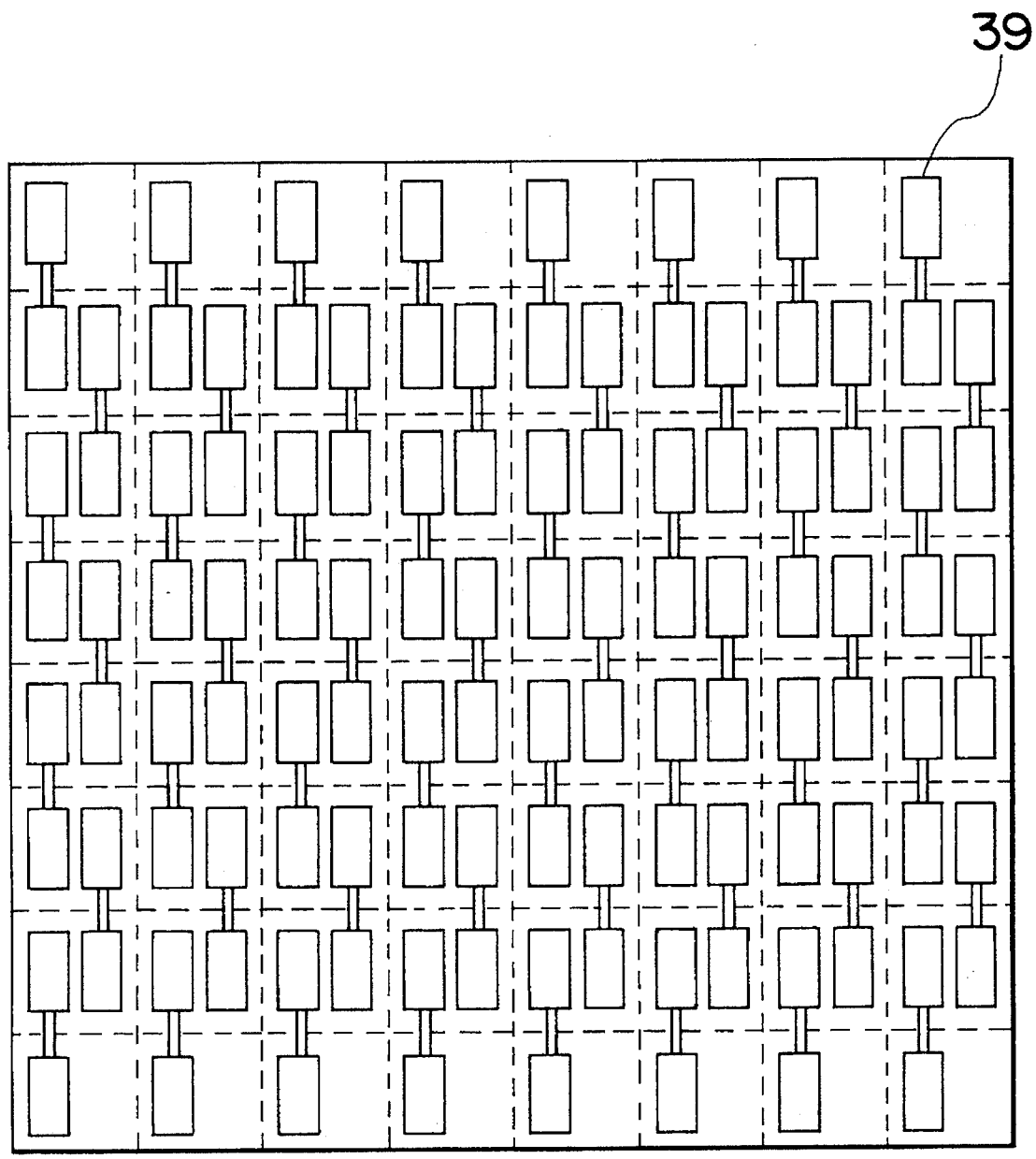
FIG. 22 is a detailed plane figure of area 49 in FIG. 18 for an alternative embodiment of the invention.

FIG. 18 is a plane figure of the light modulation device according to an alternative embodiment of the invention, and FIGS. 19, 20, 21, and 22 are detailed plane figures of areas 46, 47, 48, and 49 in FIG. 18, respectively.

This light modulation device 1 comprises a transparent electrode 2, a light shield layer 10, a photoconductive layer 3, a conductive electrode 9, a light modulation layer 5, and a second transparent electrode 2' formed together in that order and sandwiched between a substrate 6 and 6' on each side.

The light modulation device of this embodiment is divided into 4 regions 46, 47, 48, and 49 based on the electrode structure. Specifically, the geometric pattern extracted by each region differs. For example, the region 46 shown in FIG. 19 has electrodes which consists of five unit electrodes, and can extract the pattern "+". Similarly, the region 47 shown in FIG. 20 has electrodes which consists of four unit electrodes, and can extract the pattern "⊥". The region 48 shown in FIG. 21 has electrodes which consists of three unit electrodes, and can extract the pattern "∧". The region 49 shown in FIG. 22 has electrodes consists of two unit electrodes, and can extract the pattern "i".

Thus, as in the fifth and sixth embodiments of the light modulation device, the light modulation layer 5 modulates the read light 8 only at those parts where its corresponding photoconductive layer 3 is illuminated by sufficient light. In this embodiment the number of electrically connected unit electrodes 39 differs in each region, but by making the sum of the area of the connected unit electrodes the same, the shapes can be extracted with a single threshold value θ.

The electrode of each unit should satisfy following equation 2:

$$4 \times I \times S_1 < \theta < 5 \times I \times S_1$$

$$3 \times I \times S_2 < \theta < 4 \times I \times S_2$$

$$2 \times I \times S_3 < \theta < 3 \times I \times S_3$$

$$I \times S_4 < \theta < 2 \times I \times S_4 \quad (2)$$

where θ is the threshold value; $S_1$, $S_2$, $S_3$, and $S_4$ are the area of the unit electrodes in the region of 46, 47, 48, and 49, respectively; and I is the incident light intensity per unit area.

To extract, different geometric patterns with this light modulation device, the area of unit electrodes such that $S_2$, $S_3$, and $S_4$ should satisfy equation 3.

$$S_2 = 5 \times S_1 / 4$$

$$S_3 = 5 \times S_1 / 3$$

$$S_4 = 5 \times S_1 / 2 \quad (3)$$

Thus, the light modulation device according to the present embodiment can extract such the geometric shapes "+", "⊥", "∧", and "i" included in the image.

It is to be noted that the invention shall not be limited to the above description, and various other shapes can be recognized by applying the same principles and shall not be considered beyond the scope of this invention.

As described hereinabove, line segments and geometric patterns forming an input image can be extracted accurately and at high speed by means of a simple construction according to the light modulation device of the present invention.

Furthermore, line segments and geometric patterns contained in an input image can be extracted at high speed by means of the image recognition method of the invention, and image recognition with extremely high performance is possible by using this method in combination with a neural network.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light modulation device comprising:

a first transparent electrode layer, said first transparent electrode having a uniform voltage applied thereto;

a photoconductive layer formed on said first transparent electrode layer; said photoconductive layer exhibiting an increase in electrical conductivity when exposed to light;

a light modulation layer formed on said photoconductive layer for modulating a read light in accordance with an input image incident on said photoconductive layer;

a second transparent electrode layer formed on said light modulation layer; and a conductive electrode formed between said photoconductive layer and said light modulation layer; wherein said conductive electrode is divided into an n×m matrix of regions each corresponding to pixels of a digitized light input pattern, said conductive electrode forming a single layer, a plurality of unit electrodes electrically isolated with each other are arranged in each region except for regions on the outer border, and each of said plurality of unit electrodes in each region is electrically connected to one of said unit electrodes in at least one of regions surrounding each said region, wherein a read light incident on said light modulation layer and said conductive electrode is modulated at regions having unit electrodes electrically connected with each other when a summation of outputs from said unit electrodes electrically connected exceeds a predetermined threshold value.

2. The light modulation device of claim 1 wherein a shield layer is provided between said first transparent electrode and said photoconductive layer for blocking an incident light passing through areas of said conductive electrode other than those where said unit electrodes are arranged.

3. The light modulation device of claim 2 wherein an offset voltage is applied between said first and second electrode layers for controlling the threshold value set to modulated the read light.

4. The light modulation device of claim 1 wherein the light modulation characteristics of said light modulation layer is a non-linear saturation function of an electric field applied thereto.

5. The light modulation device of claim 1 wherein said conductive electrode is optically reflective.

6. The light modulation device of claim 1 wherein each of said plurality of unit electrodes in each region is connected to one of said unit electrodes in a region adjacent to each said region in a predetermined direction selected among horizontal direction, vertical direction and a direction intersecting at 45° to the horizontal direction.

* * * * *

UNITED STATES PATENT AND TRADEMARK OFFICE
CERTIFICATE OF CORRECTION

PATENT NO.  : 5,515,189
DATED       : May 7, 1996
INVENTOR(S) : Yasunori Kuratomi et al.

It is certified that error appears in the above-identified patent and that said Letters Patent is hereby corrected as shown below:

Column 1, Line 37:  "3 drops." should read --drops.--.

Column 3, Line 44:  "("/')" should read --("\')--.

Column 4, Line 27:  "2," should read --1,--.

Column 4, Line 61:  "invention, 14" should read --invention,--.

Column 5, Line 55:  "s$_u$I$^y$" should be omitted.

Signed and Sealed this

Fifth Day of May, 1998

Attest:

BRUCE LEHMAN

Attesting Officer

Commissioner of Patents and Trademarks